(12) United States Patent
Raju et al.

(10) Patent No.: US 7,649,992 B2
(45) Date of Patent: Jan. 19, 2010

(54) APPARATUSES FOR ENCODING, DECODING, AND AUTHENTICATING DATA IN CIPHER BLOCK CHAINING MESSAGING AUTHENTICATION CODE

(75) Inventors: Kartik Raju, Santa Clara, CA (US); Mehmet Un, Santa Clara, CA (US)

(73) Assignee: Fujitsu Limited, Kawasaki (JP)

( * ) Notice: Subject to any disclaimer, the term of this patent is extended or adjusted under 35 U.S.C. 154(b) by 815 days.

(21) Appl. No.: 11/326,712

(22) Filed: Jan. 6, 2006

(65) Prior Publication Data
US 2007/0189522 A1 Aug. 16, 2007

(51) Int. Cl.
H04L 9/00 (2006.01)
(52) U.S. Cl. .............................. 380/37; 380/28; 713/191
(58) Field of Classification Search .................. 380/37, 380/28, 21; 713/191
See application file for complete search history.

(56) References Cited

U.S. PATENT DOCUMENTS

| | | | | |
|---|---|---|---|---|
| 4,888,800 | A | * | 12/1989 | Marshall et al. .............. 380/281 |
| 6,128,737 | A | * | 10/2000 | Jakubowski et al. ......... 713/181 |
| 6,226,742 | B1 | * | 5/2001 | Jakubowski et al. ......... 713/170 |
| 6,937,727 | B2 | * | 8/2005 | Yup et al. ...................... 380/37 |
| 7,336,783 | B2 | * | 2/2008 | Park ............................. 380/28 |
| 2004/0250095 | A1 | * | 12/2004 | Feldman ....................... 713/191 |

OTHER PUBLICATIONS

Federal Information Processing Standards Publication 197, Advanced Encryption Standard (AES), Nov. 26, 2001, 51 pages, U.S. Department of Commerce and National Technical Information Service (NTIS), Springfield, VA, USA.

Morris Dworkin, "Draft Recommendation for Block Cipher Modes of Operation: The CCM Mode For Authentication and Confidentiality," NIST Special Publication 800-38C, Sep. 2003, 22 Pages, National Institute of Standards and Technology Gaithersburg, MD, USA.

Morris Dworkin, "Recommendation for Block Cipher Modes of Operation: The CCM Mode for Authentication and Confidentiality," NIST Special Publication 800-38C, May 2004, 26 pages, National Institute of Standards and Technology Gaithersburg, MD, USA.

Rudolf Usselmann, "AES (Rijndael) IP Core: Overview of the aes_core," http://www.opencores.com/projects.cgi/web/aes_core/overview, Nov. 8, 2002, (Later updated May 22, 2007), Opencores.org, on the Internet, no physical address provided on the website.

(Continued)

*Primary Examiner*—Carl Colin
*Assistant Examiner*—Michael Anderson
(74) *Attorney, Agent, or Firm*—Baker Botts L.L.P.

(57) ABSTRACT

A processor is provided that includes inputs to receive headers and payloads of messages in block form, a cipher key, a counter block, and an indication that a data block is ready to be received at the processor's first input, and that outputs a data block processes according to a CCM protocol and a signal requesting the provision of a data block at the processor input. The processor also includes first and second cipher circuits generating ciphered results that are a function of a input data block and an input cipher key. Furthermore, the processor includes a controller that processes a first sequence of data blocks through the first cipher circuit to generate a message integrity code and a second sequence of data blocks through the second cipher circuit to generate a set of ciphered data blocks.

15 Claims, 5 Drawing Sheets

OTHER PUBLICATIONS

Rudolf Usselmann, "Advanced Encryption Standard / Rijndael IP Core Rev. 1.1," http://www.opencores.com/cvsweb.shtml/aes_core/doc/aes.pdf Nov. 12, 2002 11 Pages, Opencores.org, on the Internet, no physical address provided on the website.

Hemanth Satyanarayana, "AES128: Overview of the aes_crypto_core," http://www.opencores.com/projects.cgi/web/aes_crypto_core/overview, Dec. 28, 2004, Opencores.org, on the Internet, no physical address provided on the website.

Hemanth Satyanarayana, "AES Implementation details" of the AES128 aes_crypto_core, http://www.opencores.com/cvsweb.shtml/aes_crypto_core/doc/ Jun. 2005, Opencores.org, on the Internet, no physical address provided on the website.

* cited by examiner

APPARATUSES FOR ENCODING, DECODING, AND AUTHENTICATING DATA IN CIPHER BLOCK CHAINING MESSAGING AUTHENTICATION CODE

FIELD OF THE INVENTION

The present invention relates to apparatuses for encoding data using the counter with cipher block chaining messaging authentication code (CCM) protocol, and to apparatuses for decoding and authenticating such data.

BACKGROUND OF THE INVENTION

Counter with cipher block chaining messaging authentication code (CCM) is a known protocol for encrypting data and enabling the encrypted data to be authenticated. The CCM algorithm uses a symmetric key block cipher algorithm as a component building block; the CCM algorithm can therefore be viewed as a mode of operation of the symmetric key block cipher. Examples of symmetric key block ciphers include the advanced encryption standard (AES) and the data encryption standard (DES).

More and more data traffic over the Internet is being encrypted by a number of cipher algorithms, with some data transmission standards, such as the IEEE 802.16 wireless standard, specifying the use of the CCM algorithm. As part of making their inventions, the inventors recognize that the CCM algorithm and the underlying block cipher would dramatically increase the computational demands on the central processing units of network servers, particularly the central processing units that implement the network protocol layer and the media-access control layer.

SUMMARY OF THE INVENTION

Broadly stated, the present invention encompasses apparatus and methods of processing data blocks according to the counter with cipher block chaining messaging authentication code (CCM) protocol. An exemplary apparatus comprises a first cipher circuit, a second cipher circuit, a controller that sequences data blocks through the cipher circuits, a first input to receive headers and payloads of messages in block form, a second input to receive a cipher key, a third input to receive a counter block, and a first output to provide a data block processes according to a cipher block chaining messaging authentication code (CCM) protocol. The controller processes a first sequence of data blocks through the first cipher circuit to generate a message integrity code and a second sequence of data blocks through the second cipher circuit to generate a set of ciphered data blocks. Further preferred embodiments comprise a fourth input to receive an indication that a data block is ready to be received at the processor's first input, and a second output (TDRY) to provide signal requesting the provision of a data block at the processor's first input.

Exemplary methods according to the present invention comprise the sets of processing two sequences of data blocks through two ciphering machines, such that the ciphering machines can process their respective sequences of block at common instances of time.

Accordingly, it is an object of the present invention to increase the rate at which data can be encrypted and/or decrypted according to the CCM protocol.

It is another object of the present invention to enable the application of the CCM protocol on data blocks conveyed in messages on communications networks.

These and other objects of the present invention will become apparent to those skilled in the art from the following detailed description of the invention, the accompanying drawings, and the appended claims.

DETAILED DESCRIPTION OF THE INVENTION

Figure 1:
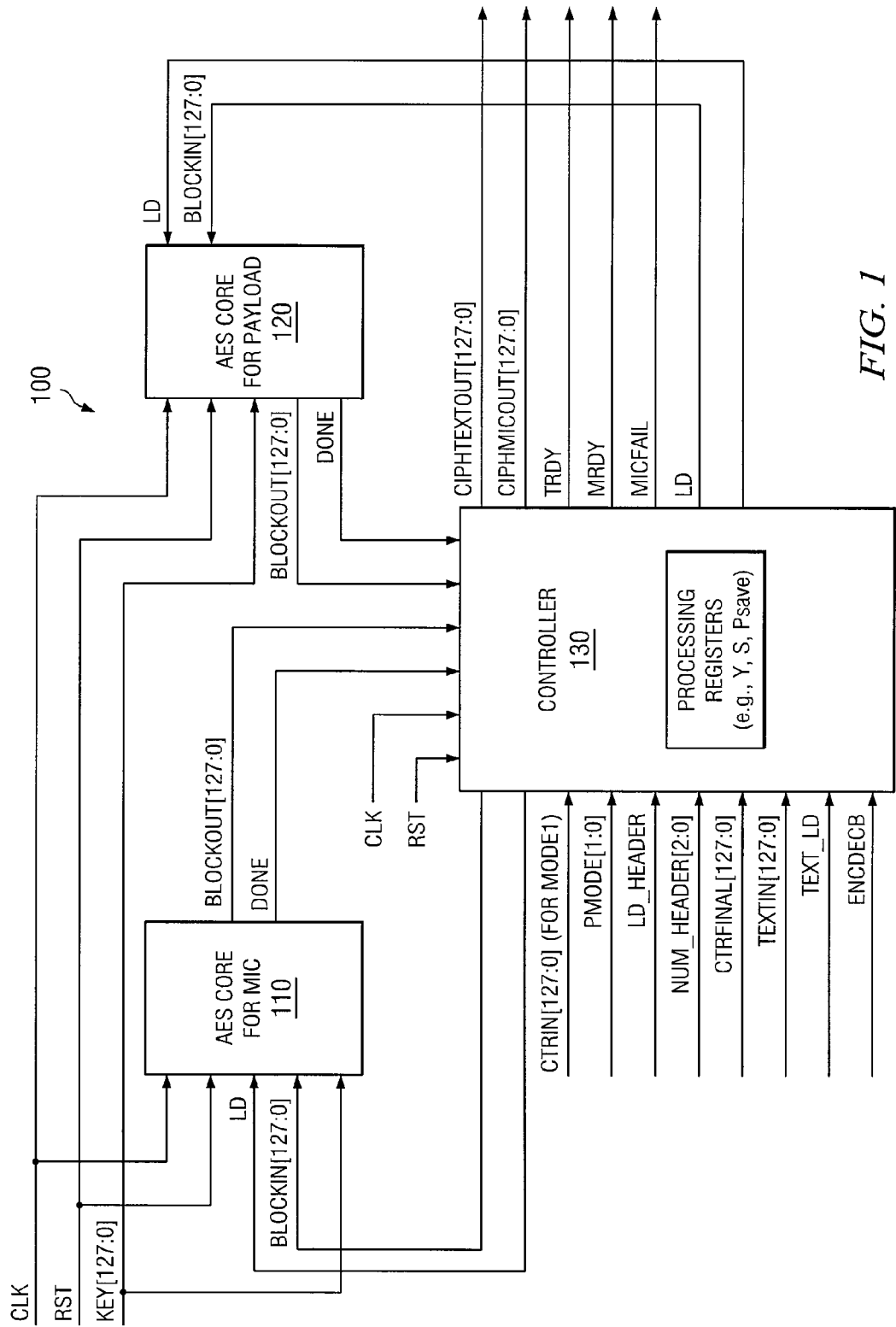
FIG. 1 shows a schematic diagram of an exemplary CCM processor according to the present invention.

In the following description, numerous specific details are set forth to provide a more thorough description of the specific embodiments of the inventions. It is apparent, however, that the inventions may be practiced without all the specific details given below. In other instances, well known features have not been described in detail so as not to obscure the inventions.

To better understand the present inventions, we first provide a general overview of the CCM encryption method as implemented on the specific organization of data that is often found in packet communications, and as further implemented according to our invention. (A more general description of the CCM encryption method can be found in (NIST) Special Publication 800-38C, entitled "DRAFT Recommendation for Block Cipher Modes of Operation: The CCM Mode for Authentication and Confidentiality," September 2003, by Morris Dworkin). In data communication environments, data is transmitted in blocks called payload blocks ($P_i$, i=1, 2, ..., NP), which are preceded by one or more header blocks ($H_j$, j=1, 2, ..., NH) that convey information as to the number of payload blocks in the transmission and an indication of where the payload blocks are to be conveyed on the network. For the purposes of this illustration, each header block ($H_j$) and each payload block ($P_i$) will be assumed to have 128 bits, or 16 bytes. In the transmission, the one or more header blocks are not encrypted, but the payload blocks are encrypted. It is often important that the transmission also include a message-integrity code (MIC), also called a message-authentication code (MAC), that can be used by the receiver to verify that the message was in fact sent by the sender specified in the header, and/or to verify that the data within the encrypted message has not been corrupted during transmission. The CCM method is able to do both of these functions (encryption of the payload and the generation of a message-integrity code that verifies both the authenticity and integrity of the message). To encrypt the payload blocks, a sequence of counter blocks ($Ctr_i$, i=1, 2, ...) is created at both the transmission and reception ends for a given communication connection. Each counter block ($Ctr_i$) has the same number of bytes as the payload block, and each counter block is associated with a particular payload block to be encrypted. The counter blocks are distinct from one another during the use of a particular cipher key (K) within a particular communication connection. The counter blocks ($Ctr_i$) need not be secret, and may be generated by incrementing a selected number of bits within the counter blocks. For example, one may start with an initial value for the first counter block, and increment this value by one for each subsequent counter block. Each counter block ($Ctr_i$) is then encrypted by a cipher algorithm using a secret key (K) to provide an encrypted counter block ($S_i$), which is associated with the same payload block ($P_i$) that the unencrypted counter block is associated with. Next, the encrypted counter block ($S_i$) is XORed with its associated payload block ($P_i$) to generate the encrypted payload block $C_i$ ($C_i=P_i \oplus S_i$). The XOR operation, which is denoted by the symbol "$\oplus$", is well known to the art, and comprises the application of the exclusive OR operation on a bit-by-bit basis of the inputs $P_i$ and $S_i$. If "a" and "b" are the corresponding bits of input blocks A and B, respectively, then the exclusive OR operation outputs a binary "1" value if and only if one of "a" and "b" has a binary "1" value (not both), and outputs a binary "0" value when "a" and "b" have the same binary value.

Because of the properties of the XOR operation, the original payload block $P_i$ can be obtained by XORing the encrypted payload block $C_i$ with the encrypted counter block ($S_i$) that was initially used to encrypt the payload block. That is to say: $P_i=S_i \oplus C_i=S_i \oplus (P_i \oplus S_i)$. Thus, if the receiver generates the encrypted counter blocks in the same manner as the sender did, it can decrypt the encrypted payload blocks. This is readily accomplished by having the sender and receiver agree on how the counter blocks for a communication channel will be generated (which may be non-secret), and by having both the sender and receiver use the same secret key K to encrypt the counter blocks. Methods of secretly communicating a key K from a sender to a receiver (or vice versa) are well known to the art and do not form a part of the present invention. The operations involved in encrypting and decrypting the payload blocks for a transmission that has one header block (H) and three payload blocks $P_1$, $P_2$, $P_3$ are given in Table I below, where "CIPH ($Ctr_1$, K)" denotes the selected cipher algorithm applied to the counter block with secret key K:

TABLE I

Payload Encryption
Sender side

Receive H, $P_1$, $P_2$, and $P_3$ to encrypt.
Obtain or generate counter blocks $Ctr_1$, $Ctr_2$, and $Ctr_3$, and compute:
$S_1$ = CIPH ($Ctr_1$, K);
$C_1$ = ($P_1 \oplus S_1$);
$S_2$ = CIPH ($Ctr_2$, K);
$C_2$ = ($P_2 \oplus S_2$);
$S_3$ = CIPH ($Ct_3$, K);
$C_3$ = ($P_3 \oplus S_3$).
Send H, $C_1$, $C_2$, $C_3$, and message integrity code (discussed below) to the Receiver.
Payload Decryption
Receiver side Receive H, $C_1$, $C_2$, and $C_3$ to decrypt, and the message integrity code to authenticate (discussed below).
Obtain or generate counter blocks $Ctr_1$, $Ctr_2$, and $Ctr_3$, and compute:
$S_1$ = CIPH ($Ctr_1$, K);
$P_1$ = ($C_1 \oplus S_1$);
$S_2$ = CIPH ($Ctr_2$, K);
$P_2$ = ($C_2 \oplus S_2$);
$S_3$ = CIPH ($Ct_3$, K);
$P_3$ = ($C_3 \oplus S_3$);
Provide H, $P_1$, $P_2$, and $P_3$ to the destination application if the message integrity code can be authenticated.

The goal of generating the message integrity code (MIC) is to provide a group of encrypted bytes whose values depend upon the header and payload blocks and the encryption key K in a deterministic way that can be reproduced at the receiver side, yet whose values cannot be reproduced by outside parties. A recursive computation is used in the CCM encryption method to generate the MIC at the sender side, and the MIC is sent to the receiver. The receiver duplicates the recursive computation at its side, and determines if it comes up with the same MIC as that sent by the sender. If so, the message is authenticated. If not, the message is either not authentic or has lost its integrity. At each side (sender and receiver), the recursive computation begins by encrypting the first header block of the message with the key K to generate a first intermediate block $Y_0$ ($Y_0$=CIPH ($H_1$, K)). Then, if there is a second header block, it is XORed with intermediate block $Y_0$, and the result is encrypted with the key K to generate a second intermediate block $Y_1$ ($Y_1$=CIPH (($H_2 \oplus Y_0$,), K)). This recursion continues for the remaining header blocks in the same manner, and is then applied in the same manner to the blocks of the payload, ending with a final intermediate block $Y_n$. Thus, in the case that there were only two header blocks, then the next intermediate block $Y_2$ would be $Y_2$=CIPH (($P_1 \oplus Y_1$,), K)), and the next following intermediate block $Y_3$ would be $Y_3$=CIPH (($P_2 \oplus Y_2$,), K)). Thus, the final intermediate block $Y_n$ is a function of the original header and payload (which serves to authenticate the message), and a function of the key (which serves to authenticate the sender). However, three additional steps are performed to arrive at the MIC, the additional steps serving to effectively encrypt the final intermediate block $Y_n$. First, another counter block (we call it $Ctr_0$ here) is encrypted with the key K to produce an encrypted counter block $S_0$ ($S_0$=CIPH ($Ctr_0$, K)). Next, the final intermediate block $Y_n$ is XORed with encrypted counter block $S_0$ to produce the product block T. Finally, the MIC is generated by taking the most significant 64 bits of T (MIC=MSB_64 (T)). The steps generating the MIC at the sender and the steps of authenticating the MIC at the receiver are listed below in Table II for the common case of a message having one header block ($H_1$) and three payload blocks ($P_1$, $P_2$, $P_3$), where the subscript "S" has been added to the block names to indicate the generation of the blocks at the sender side, and the subscript "R" has been added to the block names to indicate the generation of the blocks at the receiver side.

TABLE II

Generation of MIC
Sender side

Receive $H_1$, $P_1$, $P_2$, and $P_3$ to generate an associated MIC.
Obtain or generate a counter block $Ctr_0$, and compute:
$Y_{0,S}$ = CIPH ($H_1$, K);
$Y_{1,S}$ = CIPH (($P_1 \oplus Y_{0,S}$), K);
$Y_{2,S}$ = CIPH (($P_2 \oplus Y_{1,S}$), K);
$Y_{3,S}$ = CIPH (($P_3 \oplus Y_{2,S}$), K);
$S_0$ = CIPH ($Ctr_0$, K);
$T_S$ = ($Y_{3,S} \oplus S_0$);
$MIC_S$ = MSB_64 ($T_S$).
Send $MIC_S$ along with H, $C_1$, $C_2$, $C_3$, to the Receiver.
Authentication of MIC
Receiver side Receive $H_1$, $C_1$, $C_2$, $C_3$, and $MIC_S$.
Decrypt $C_1$, $C_2$, and $C_3$, to produce $P_1$, $P_2$, $P_3$, as discussed above.
Obtain or generate counter block $Ctr_0$, and compute:
$Y_{0,R}$ = CIPH ($H_1$, K);
$Y_{1,R}$ = CIPH (($P_1 \oplus Y_{0,R}$), K);
$Y_{2,R}$ = CIPH (($P_2 \oplus Y_{1,R}$), K);
$Y_{3,R}$ = CIPH (($P_3 \oplus Y_{2,R}$), K);
$S_0$ = CIPH ($Ctr_0$, K);
$T_R$ = ($Y_{3,R} \oplus S_0$);
$MIC_R$ = MSB_64 ($T_R$).

TABLE II-continued

Test to see if $MIC_R = MIC_S$. If yes, the transmission is authenticated and verified as having its original integrity. If not, the message is either not authentic or has lost its integrity.

General Overview. FIG. 1 is a block diagram of an exemplary CCM processor 100 according to the present invention using the AES encryption standard as the cipher function CIPH. CCM processor 100 comprises a first AES core 110, a second AES core 120, and a controller 130. AES 110 and 120 are identical in construction and, as explained below in greater detail, carry out an AES cipher on a block of data (BLOCKIN) using key K to provide a result BLOCKOUT=AES (BLOCKIN, K), wherein AES( ) can be used for CIPH( ) in the above description of our implementation of the CCM encryption method. Instead of AES cores, DES cores may be used, and cores implementing other encryptions may be used. Regardless of which encryption cores are used, it is preferred that cores 110 and 120 encrypt the data (BLOCKIN) in the same way, and produce the same result for the same input text and key. As explained in greater detail below, AES core 110 is used in processes that generate or authenticate the MIC code, and AES core 120 is used in processes that encrypt or decrypt the payload blocks.

CCM processor 100 further comprises two "directional" modes of operation that indicate whether the data is being encrypted (such as at the sender side) or decrypted (such as at the receiver side). The first directional mode is simply called encryption mode, and the second directional mode is called decryption mode. The indication of which mode for processor 100 to use may be conveyed to it on a single digital line, which may convey a value of "1" for the encryption mode and a value of "0" for the decryption mode. That signal line is shown in FIG. 1 as signal ENCDECB, which goes to controller 130.

CCM processor 100 further comprises three processing modes of operation, which may be simply designated as Mode 0 or "Automatic Mode," Mode 1 or "Manual Mode," and Mode 2 or "Plain Mode." In Automatic Mode, the counter blocks are generated automatically from an initial counter block, as described below in greater detail. In Manual Mode, all of the counter blocks used for a particular CCM encryption are provided to CCM processor 100, and are not generated automatically. In Plain Mode, CCM encryption is not performed on the input data and no counter blocks are used; instead, an AES cipher using key K is performed on the input data block. The processing mode of operation may be conveyed to processor 100 on two signal lines, which can encode up to four different digital values: 0, 1, 2, and 3. These signal lines are shown in FIG. 1 as signal lines PMode[1:0], where the digital values of 0, 1, and 2 thereon are used to indicate Mode 0, Mode 1, and Mode 2, respectively.

Thus, there are a total of six possible operating modes, depending upon the encryption direction and the processing method. It is noted that the need to perform plain AES decryption (corresponding to the combination of decryption mode and plain mode) is generally not needed in networking applications. Therefore, it is not described herein, but nonetheless it would be within the ability of one of ordinary skill in the art to implement in view of the teachings of the present specification. Thus, for the remaining description, it will be assumed that the User of processor 100 sets the ENCDECB signal to value "1" whenever the plain mode of processing is selected. Signals PMode[1:0], ENCDECB, and the other inputs provided to processor 100 are provided by the User of processor 100. The User of processor 100 is another circuit that employs processor 100 as a co-processor or encryption engine. As explained below in greater detail, the User will coordinate the provision of data to and from processor 100 through several load signals and ready signals.

In preferred embodiments, processor 100 is clocked by a clock signal CLK in the conventional way that digital circuits are clocked, and can be placed in a starting state by the assertion on a reset signal RST. Also in preferred embodiments, the User of processor 100 first places processor 100 in the starting state, and then provides the key K, the initial counter block, and the first block of data (a header block) to processor 100 for processing. After processor 100 has processed the first block, it stores some intermediate results, and sends an indication to the User that it is ready to receive the next block of data for processing. For the second block and remaining blocks to be processed, processor 100 processes the block, stores intermediate results, outputs any encrypted or decrypted payload blocks that are generated during the processing cycle, and thereafter sends an indication to the User that it is ready to receive the next block of data for processing. Then, the MIC code is generated and, in the case of the decryption processing mode, verified against the MIC received from the sender. For this, the User may load the received MIC into processor 100 in the last processing cycle. The time to process a block (i.e., the process cycle time) usually spans several clock cycles, such as 10 to 15 cycles. In each process cycle, one or both of cores 110 and 120 are active, and controller 130 directs the flow of data to and from cores 110 and 120, performs XORing operations as needed, stores intermediate results, and informs the User of the need to provide another block of input data. As will be explained below, the number of header blocks and payload blocks to be processed are either provided directly or indirectly to processor 100.

AES cores 110 and 120 are identical in construction. Each core has a first input port for receiving the key signals KEY[127:0], second and third input ports to receive the CLK and RST signals, a fourth input port to receive a data block from controller 130 on signal lines BLOCKIN[127:0] to be encrypted, and a fifth input port to receive a load signal from controller 130 to load the data block on lines BLOCKIN[127:0] and thereafter process it. The processing takes 10 clock cycles (CLK). When each of cores 110 and 120 is done processing, it outputs a ciphered output block at an output port BLOCKOUT[127:0], and generates a Done signal on a second output port. These outputs are provided to controller 130, which collects the ciphered output from BLOCKOUT[127:0] when it detects the Done signal from the core. Designs for cores 110 and 120 are known to the art, and are made available at many resource sites on the Internet. One such site is www.opencores.com. It is well within the ability of one of ordinary skill in the art to find such designs and use them in implementing the present inventions.

Input and Output Signals. Next, we describe the input and output signals of processor 100. Clock signal CLK is a standard clock signal, and it is provided to each of components 110, 120, and 130. Reset signal RST is provided to each of components 110, 120, and 130 to place each of the components in a starting state when the signal is activated. Signal RST may have an active-low orientation or an active high orientation, and its timing may be asynchronous with respect to clock signal CLK. Signal lines KEY[127:0] convey a 128-bit key needed for the encryption process. These signals lines may go directly to AES cores 110 and 120 and, in preferred embodiments, are held in valid states by the User until processor 100 provides its output results. As another approach, processor 100 may comprise latches to hold these values in response to a load signal (which may be signal LD_HEADER described below). Signal lines TEXTIN[127:0] convey 128 bits (a block of 16 bytes) of data input (called a "data block"), which may be a header block or payload block, depending upon the block's position in the input sequence. The header and payload blocks provided are in sequential order over signal lines TEXTIN[127:0], each block being conveyed by the User during a respective processing cycle. The header blocks are conveyed first, followed by the payload blocks. If the data within the last header block or last payload block is less than 128 bits, it should be aligned to the most significant bit of TEXTIN[127:0], and the least significant bits thereof padded with zero values. Input TEXT_LD is asserted by the User to indicate to processor 100 that a block of data is ready to be loaded in from signal lines TEXTIN[127:0]. Processor 100 provides two output ready signals. First is signal line TRDY, which is asserted to indicate to the User that processed payload text is available at output signals CIPHTEXTOUT [127:0]. In encryption mode, the processed text at CIPHTEXTOUT [127:0] is an encrypted payload block; in decryption mode, the processed text at CIPHTEXTOUT [127:0] is a decrypted payload block. The second ready output from the processor is signal MRDY, which is asserted when the MIC is available on CIPHMICOUT [127:0]. Signal line TRDY will also be used to inform the User to provide the next data block in the sequence on signal lines TEXTIN[127:0] and cause processor 100 to load it by asserting signal TEXT_LD. Signal TEXT_LD may be asserted the very next clock cycle of clock signal CLK after processor 100 asserts signal line TRDY. In addition, for decryption mode, processor 100 has a status signal line MICFAIL that, when asserted, indicates the received MIC was not authenticated.

Signal lines NUM_HEADER[2:0] convey a digital value indicating the number of header blocks that will be sent over signal lines TEXTIN[127:0] in the sequence that will provide the header and payload blocks. Signal lines CTR_FINAL [127:0] are used only in the Automatic and Manual processing modes, and convey the final counter block value $Ctr_{NP}$ for the payload. The last two bytes of the value provided on CTR_FINAL[127:0] have the number NP of payload blocks that will be conveyed in the sequence of data blocks, and are copied to a countdown register by controller 130. In Automatic Mode, the sequence of counter blocks is generated from $Ctr_{NP}$ as follows: each of the counter blocks $Ctr_1$ through $Ctr_{NP-1}$ has the same first fourteen bytes as the final counter block $Ctr_{NP}$. The last two bytes of the first counter block $Ctr_1$ are set to a digital value of 1 (i.e., 00000000 00000001), with the last two bytes of each subsequent counter block in the sequence being incremented by one with respect to the last two bytes of the previous block. That is to say that the last two bytes in counter block $Ctr_2$ hold a digital value of 2, the last two bytes in counter block $Ctr_3$ hold a digital value of 3, etc. The counter block used for the MIC processing, counter block $Ctr_0$, has the same first fourteen bytes as the final counter block $Ctr_{NP}$, but has a digital value of zero in its last two bytes. An input signal LD_HEADER is asserted by the User to inform processor 100 that the values on signal lines NUM_HEADER[2:0] and CTR_FINAL[127:0] are valid and ready to be loaded into processor 100.

In manual processing mode, signal lines CTRIN[127:0] convey the counter blocks of the sequence. Each counter block is loaded automatically when processor 100 asserts the ready line TRDY after the header blocks have been processed. In manual mode, the User has to wait for the header blocks to be processed before presenting the sequence of counter blocks. Since the User knows the number of header blocks (signal NUM_HEADER), it can count the number of assertions of signal TRDY after the process has been started to determine when to start sequencing the counter blocks.

As indicated above, processor 100 processes input data blocks and output resulting ciphered or decrypted blocks (if ready) in processing cycles. In each process cycle, one or both of cores 110 and 120 are active, and controller 130 directs the flow of data to and from cores 110 and 120, performs XORing operations as needed, stores intermediate results to a plurality of registers, including two 128-bit registers Y and S, and informs the User of the need to provide another block of input data. Register Y is used to store intermediate results of the recursion computation for the MIC generation and MIC authentication; and Register S is used to store the ciphered counter blocks. Each processing cycle takes several clock cycles of clock CLK. Controller 130 may comprise a finite state machine that cycles through a main state for each processing block, with there being several sub-states for each main processing state.

Below, we give a detailed example implementation of the main states that can be used by controller 130. However, before doing that, we note that the steps outlined in Tables I and II above may be condensed and streamlined in processing cycles according to our invention and can use just two registers Y and S to store intermediate results. First, we present the processing flow for encryption under both automatic and manual modes. Four processing cycles are shown A-D, and the actions detailed therein are self-explanatory. The reader can also readily verify that they duplicate the steps given in Tables I and II for encryption at the sender side.

Encryption Processing Flow for Both Automatic and Manual Modes

A. Set register Y=0 and register S=0;

B. Receive header block $H_j$, j=1 to j=NH, and do this group of actions during a processing cycle:
{generate ($H_j \oplus Y$);
send ($H_j \oplus Y$) to core 110 to be ciphered with Key K;
store the ciphered result from core 110 in register Y;
}.

C. Receive payload block $P_i$, i=1 to i=NP, and do this group of actions during a processing cycle:
{generate ($P_i \oplus Y$);
send ($P_i \oplus Y$) to core 110 to be ciphered with key K;
store the ciphered result from core 110 in Y;
generate or receive counter block $Ctr_i$;
send counter block $Ctr_i$ to core 120 to be ciphered with key K;
store the ciphered result from core 120 in register S;
generate ($P_i \oplus S$) and output it as ciphered payload block $C_i = (P_i \oplus S)$;
}.

D. Do this group of actions during a processing cycle:
{Send counter block $Ctr_0$ to core 120 to be ciphered with key K;
Store the ciphered result from core 120 in register S;
Output MIC as MSB_64 ($Y \oplus S$);
}.

Next, we present the processing flow for decryption under both automatic and manual modes. Five processing cycles are shown A-E, and the actions detailed therein are self-explanatory. The reader can also readily verify that they duplicate the steps given in Tables I and II for decryption at the receiver side. We note that the actions in processing Cycle "C" can be done at the same time as the last iteration of processing cycle "B" is done.

Decryption Processing Flow for Both Automatic and Manual Modes

A. Set register Y=0 and register S=0.

B. Receive header block $H_j$, j=1 to j=NH, and do this group of actions during a processing cycle:
{generate ($H_i \oplus Y$);
send ($H_i \oplus Y$) to core 110 to be ciphered with Key K;
store the ciphered result from core 110 in register Y.
}.

C. Do this group of actions during a processing cycle:
{generate or receive the first counter block $Ctr_1$;
Receive first encrypted payload block $C_1$;
send first counter block $Ctr_1$ to core 120 to be ciphered with key K;
store the ciphered result from core 120 in register S.
generate ($C_1 \oplus S$) and output it as decrypted payload block $P_1=(C_1 \oplus S)$;
store $P_1=(C_1 \oplus S)$ in a temporary register $P_{SAVE}$;
}.

D. Receive each remaining encrypted payload block $C_i$, i=2 to i=NP, and do this group of actions during a processing cycle:
{generate ($P_{SAVE} \oplus Y$);
send ($P_{SAVE} \oplus Y$) to core 110 to be ciphered with key K;
store the ciphered result from core 110 in Y;
send counter block $Ctr_i$ to core 120 to be ciphered with key K;
store the ciphered result from core 120 in register S;
output i-th decrypted payload block as $P_i=(C_i \oplus S)$;
store $P_i=(C_i \oplus S)$ in temporary register $P_{SAVE}$;
}.

E. Do this group of actions during a processing cycle:
{generate ($P_{SAVE} \oplus Y$);
send ($P_{SAVE} \oplus Y$) to core 110 to be ciphered with key K, and send counter block $Ctr_0$ to core 120 to be ciphered with key K;
store the ciphered result from core 110 in Y, and store the ciphered result from core 120 in register S;
generate MSBL__64 ($Y \oplus S$) and output;
if MSB__64 ($Y \oplus S$) is not the same as the received MIC, assert signal MICFAIL;
assert signal MRDY;
}.

The astute observer will recognize that registers $P_{SAVE}$ and S can be shared since the usage of the data held therein does not overlap. Nonetheless, in order to reduce confusion, we have used two registers here and below.

Figure 2:
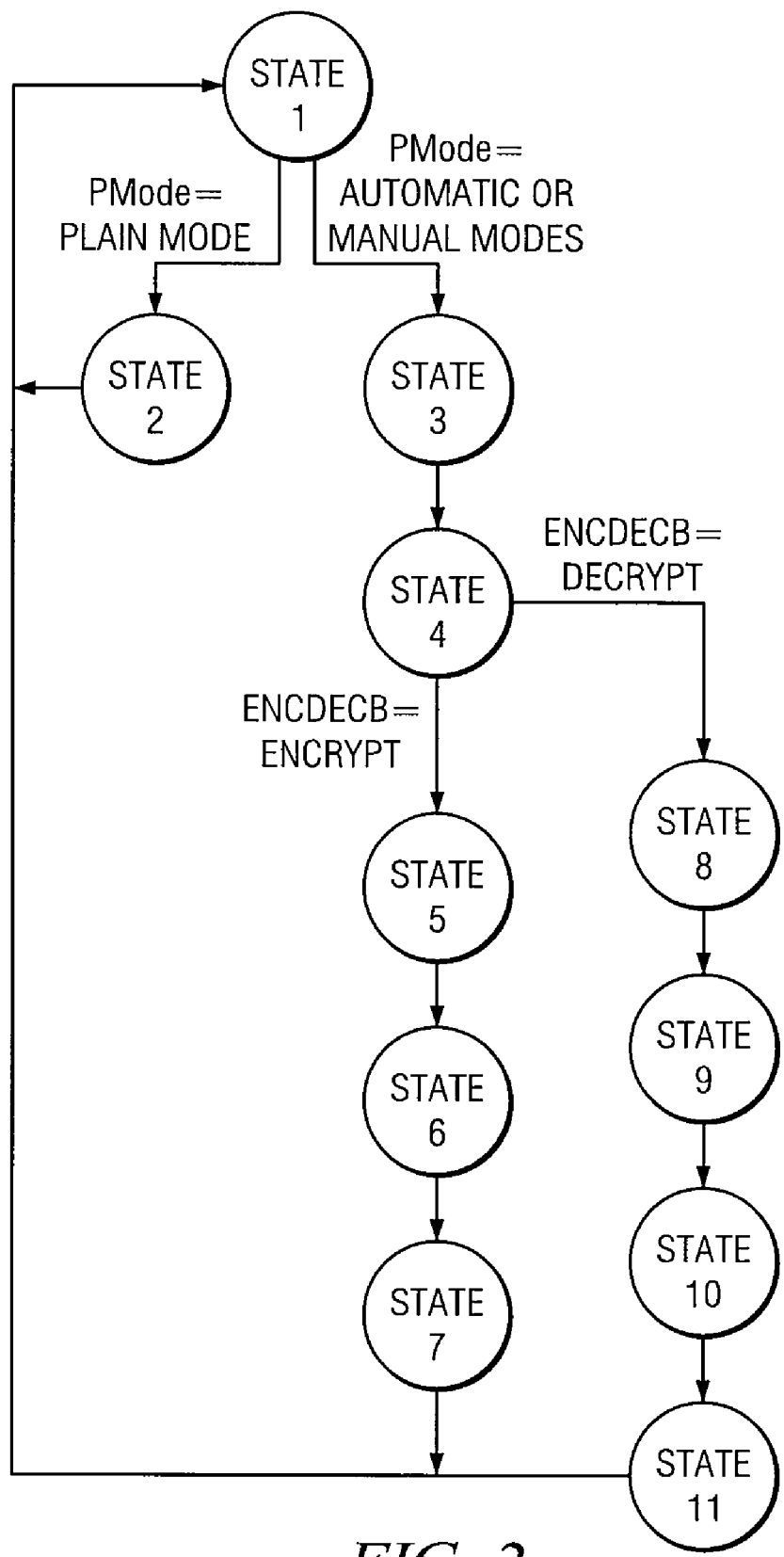
FIG. 2 shows a flow diagram of the flow through a set of exemplary main states according to the present inventions.

We now provide below a detailed example implementation of the main states that can be used by controller 130 to implement the actions according to the above processing cycles. The flow through the main states is illustrated in FIG. 2. We have included additional actions to implement the plain encryption mode, which simply entails receiving a data block, sending it to an encryption core, and then outputting the result. The below example gives detailed references to where information is taken in from the input lines by processor 100, and where it is outputted to the output lines. Each main state is implemented with one or more cycles of clock signal CLK, and multiple actions may take place at the same time (e.g., those actions which do not depend upon each other's results may be done at the same time). In fact, because each ciphering operation with cores 110 and 120 takes several cycles, it is preferred that cores 110 and 120 be loaded with data so as to operate concurrently. The description of the main states is self-explanatory. In view of the description, it is within the ability of one of ordinary skill in the art to construct a state machine or microprocessor to implement controller 130 with the main states detailed below.

State #1 (initialization). Set registers Y=0 and S=0 in response to the assertion of reset signal RST by the User. If Pmode[1:0] indicates Plain mode, then go to State #2, otherwise go to State #3.

State #2 (Plain Mode handling).
{2a. receive a data block $P_i$ provided on signal lines TEXTIN[127:0] in response to the User asserting signal TEXT_LD;
2b. send $P_i$ to core 120 to be ciphered with key K (place data on the appropriate BLOCKIN lines and activate the appropriate LD line to core 120);
2c. in response to Done signal from core 120, store the ciphered result from core 120 in register S;
2d. output value of register S on CIPHERTEXTOUT[127:0] and assert signal line TRDY to let the User know that cipher data is present on CIPHERTEXTOUT[127:0];
2e. go back to State #1.}.

State #3. In response to the assertion of the signal LD_HEADER by the User, receive mode indications on signal lines ENCDECB and Pmode[1:0], the number of header blocks NH over signal lines NUM_HEADER[2:0], and the final counter block $Ctr_{NP}$ over signal lines CTR_FINAL[127:0]. Ascertain the number of payload blocks NP from last two bytes of CTR_FINAL[127:0] and load into a register. Go to State #4.

State #4. If signal ENCDECB indicates encryption mode, then go through States #5-#7 below in sequence, with any iterations of a state as indicated; if signal ENCDECB indicates decryption mode, then go through states #8-#11 below, with any iterations of a state as indicated.

State #5 (Start of Encryption Processing, header processing). For each header block $H_j$, j=1 to j=NH, do this group of actions:
{5a. receive a data block $H_j$ provided on signal lines TEXTIN[127:0] in response to the User asserting signal TEXT_LD;
5b. generate ($H_j \oplus Y$);
5c. send ($H_j \oplus Y$) to core 110 to be ciphered with Key K (place data on the appropriate BLOCKIN lines and activate the appropriate LD line to core 110);
5d. In response to a Done signal from core 110, store the ciphered result from core 110 in Y;
5e. assert signal line TRDY to let the User know to provide the next block of data on signal lines TEXTIN[127:0];}.

State #6 (Payload processing). For each payload block $P_i$, i=1 to i=NP, do this group of actions:
{6a. receive a data block $P_i$ provided on signal lines TEXTIN[127:0] in response to the User asserting signal TEXT_LD;
6b. if mode signal Pmode[1:0] indicates manual mode, then load counter block $Ctr_i$ from input lines CTRIN[127:0]; if mode signal Pmode[1:0] indicates automatic mode, then generate counter block $Ctr_i$ with the first 14 bytes from final counter block $Ctr_{NP}$ and last two bytes equal to the value of the iteration index "i"; counter block $Ctr_i$ can be temporarily stored in register S;
6c. generate ($P_i \oplus Y$);
6d. send ($P_i \oplus Y$) to core 110 to be ciphered with key K, and send counter block $Ctr_i$ to core 120 to be ciphered with key K (place data on the appropriate BLOCKIN lines and activate the appropriate LD line to cores 110 and 120);

6e. In response to Done signals from cores and 110 and 120, store the ciphered result from core 110 in Y, and store the ciphered result from core 120 in register S;

6f. generate ($P_i \oplus S$), output ($P_i \oplus S$) on CIPHERTEXTOUT [127:0], and assert signal line TRDY to let the User know that cipher data is present on CIPHERTEXTOUT [127:0], and to let the User know to provide the next block of data on signal lines TEXTIN[127:0];}.

State #7 (MIC finalization). Do these actions in a processing cycle:

{7a. send final counter block $Ctr_0$ to core 120 to be ciphered with key K (place data on the appropriate BLOCKIN lines and activate the appropriate LD line to core 120);

7b. in response to a Done signal from core 120, store the ciphered result from core 120 in register S;

7c. output MIC as ($Y \oplus S$) on signal lines CIPHERMICOUT[127:0] and assert signal line MRDY to let the User know that the MIC is ready; the User may then take only the 64 most significant bits on signal lines CIPHERMICOUT[127:0] to effect the MSB_64(*) operation;

7d. go back to State #1 above;}.

State #8 (Start of decryption processing, header processing). For each header block $H_j$, j=1 to j=NH, do this group of actions:

{8a. receive a data block $H_j$ provided on signal lines TEXTIN[127:0] in response to the User asserting signal TEXT_LD;

8b. generate ($H_j \oplus Y$);

8c. send ($H_j \oplus Y$) to core 110 to be ciphered with Key K (place data on the appropriate BLOCKIN lines and activate the appropriate LD line to core 110);

8d. in response to Done signal from core 110, store the ciphered result from core 110 in Y;

8e. assert signal line TRDY to let the User know to provide the next block of data on signal lines TEXTIN[127:0];}.

State #9 (Processing of first encrypted payload block $C_1$). Do these actions in a processing cycle:

{9a. receive first encrypted data block $C_1$ provided on signal lines TEXTIN[127:0] in response to the User asserting signal TEXT_LD;

9b. if mode signal Pmode[1:0] indicates manual mode, then load counter block $Ctr_1$ from input lines CTRIN[127:0], if mode signal Pmode[1:0] indicates automatic mode, then generate counter block $Ctr_1$ with first 14 bytes from and last two bytes equal to the value "1"; counter block $Ctr_1$ can be temporarily stored in register S;

9c. send counter block $Ctr_1$ to core 120 to be ciphered with key K (place data on the appropriate BLOCKIN lines and activate the appropriate LD line to core 120);

9d. In response to Done signal from core 120, store the ciphered result from core 120 in register S;

6e. generate ($C_1 \oplus S$) and store it in a temporary register $P_{SAVE}$;

6f. output ($C_1 \oplus S$) on CIPHERTEXTOUT[127:0] as decrypted payload block $P_1$, and assert signal line TRDY to let the User know that decrypted data is present on CIPHERTEXTOUT[127:0], and to let the User know to provide the next block of data on signal lines TEXTIN[127:0];}.

State #10 (Process remaining encrypted payload blocks and continue MIC generation.) For each remaining encrypted payload block $C_i$, i=1 to i=NP, do the following actions:

{10a. receive next encrypted data block $C_i$ provided on signal lines TEXTIN[127:0] in response to the User asserting signal TEXT_LD;

10b. if mode signal Pmode[1:0] indicates manual mode, then load counter block $Ctr_i$ from input lines CTRIN[127:0]; if mode signal Pmode[10] indicates automatic mode, then generate counter block $Ctr_i$ with the first 14 bytes from final counter block $Ctr_{NP}$ and last two bytes equal to the value "i"; counter block $Ctr_i$ can be temporarily stored in register S;

10c. generate ($P_{SAVE} \oplus Y$);

10d. send ($P_{SAVE} \oplus Y$) to core 110 to be ciphered with key K, and send counter block $Ctr_i$ to core 120 to be ciphered with key K (place data on the appropriate BLOCKIN lines and activate the appropriate LD lines to cores 110 and 120);

10e. In response to Done signals from core 110 and 120, store the ciphered result from core 110 in register Y; store the ciphered result from core 120 in register S;

10f. generate ($C_i \oplus S$) and store it in temporary register $P_{SAVE}$;

10e. output ($C_i \oplus S$) on CIPHERTEXTOUT[127:0] as decrypted payload block $P_1$, and assert signal line TRDY to let the User know that decrypted data is present on CIPHERTEXTOUT[127:0], and to let the User know to provide the next block of data on signal lines TEXTIN[127:0];}.

State #11 (MIC authentication).

{11a. Receive MIC to be authenticated on signal lines TEXTIN[127:0];

11b. generate ($P_{SAVE} \oplus Y$);

11c. send ($P_{SAVE} \oplus Y$) to core 110 to be ciphered with key K, and send final counter block $Ctr_0$ to core 120 to be ciphered with key K (place data on the gappropriate BLOCKIN lines and activate the appropriate LD lines to cores 110 and 120);

11d. in response to Done signals from cores 110 and 120, store the ciphered result from core 110 in Y, and store the ciphered result from core 120 in register S;

11e. output ($Y \oplus S$) on signal lines CIPHERMICOUT[127:0].

11f. test the received MIC against MSB_64($Y \oplus S$); if not the same, assert signal MICFAIL;

11g. assert signal line MRDY to let the User know that the status of the MICFAIL is ready to be read and the value of the computed text MIC is ready as the 64 most significant bits on signal lines CIPHERMICOUT[127:0];

11h. go back to State #1 above;}.

As can be seen above, States 5 through 7 process encryption for both the automatic and manual modes. It may be appreciated that the implementation in each of these states could be simplified if the states handled only one of manual or automatic mode. A simple way to effect this create duplicate states 5' through 7' that perform their actions for automatic mode, and then have original states perform their actions for manual mode. Then, state 4 can place controller 130 in state 5 if manual mode have been selected, or state 5' if automatic mode had been selected. Then same arrangement can be made for states 8-11, with new states 8'-11' configured to perform their actions for automatic mode and original states 8-11 configured to perform their actions for manual mode. Then, state 4 can place controller 130 in state 8 if manual mode have been selected, or state 8' if automatic mode had been selected.

Figure 3:
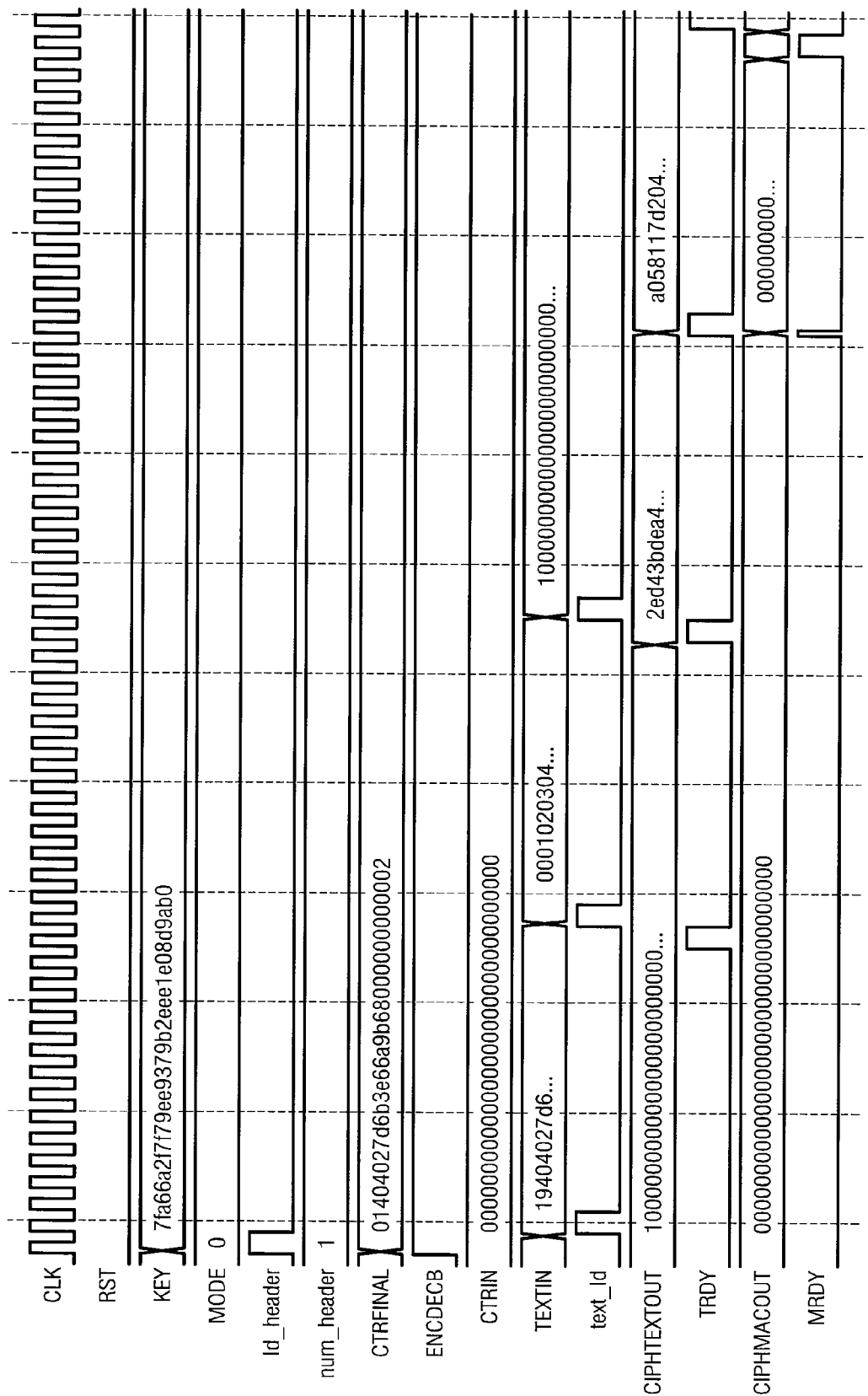
FIG. 3 shows a timing diagram of selected signals for exemplary automatic encryption according to the present inventions.

Some examples are now provided for the Automatic Encryption, Automatic Decryption, and Plain modes. FIG. 3 shows the timing diagrams of selected signals for automatic encryption on one block of header and two payload blocks. Num_header is forced to 1, as there is only one header block. CTRFINAL is loaded with a final counter block value. Note that the last two bytes is 0002 indicating that there are two blocks of data in payload. When LD_HEADER is asserted the CTRFINAL and NUM_HEADER is loaded internally. The first TEXT_LD loads the single header block of data. After the MIC AES engine processes this single header block it asserts TRDY. The next Clock cycle the first block of payload data is forced. This block runs through MIC AES engine and CIPHER AES engine. The first Ciphertext is available on TRDY. The last block of payload is then forced. At TRDY the Ciphertext is available. At this point AES core 120 automatically encrypts the MIC generated by AES core 110 and output its on Ciphertext. MIC Ciphertext should be taken when MRDY is asserted. The Immediate TRDY after MRDY indicates that processor 100 is ready for the next set of data.

Figure 4:
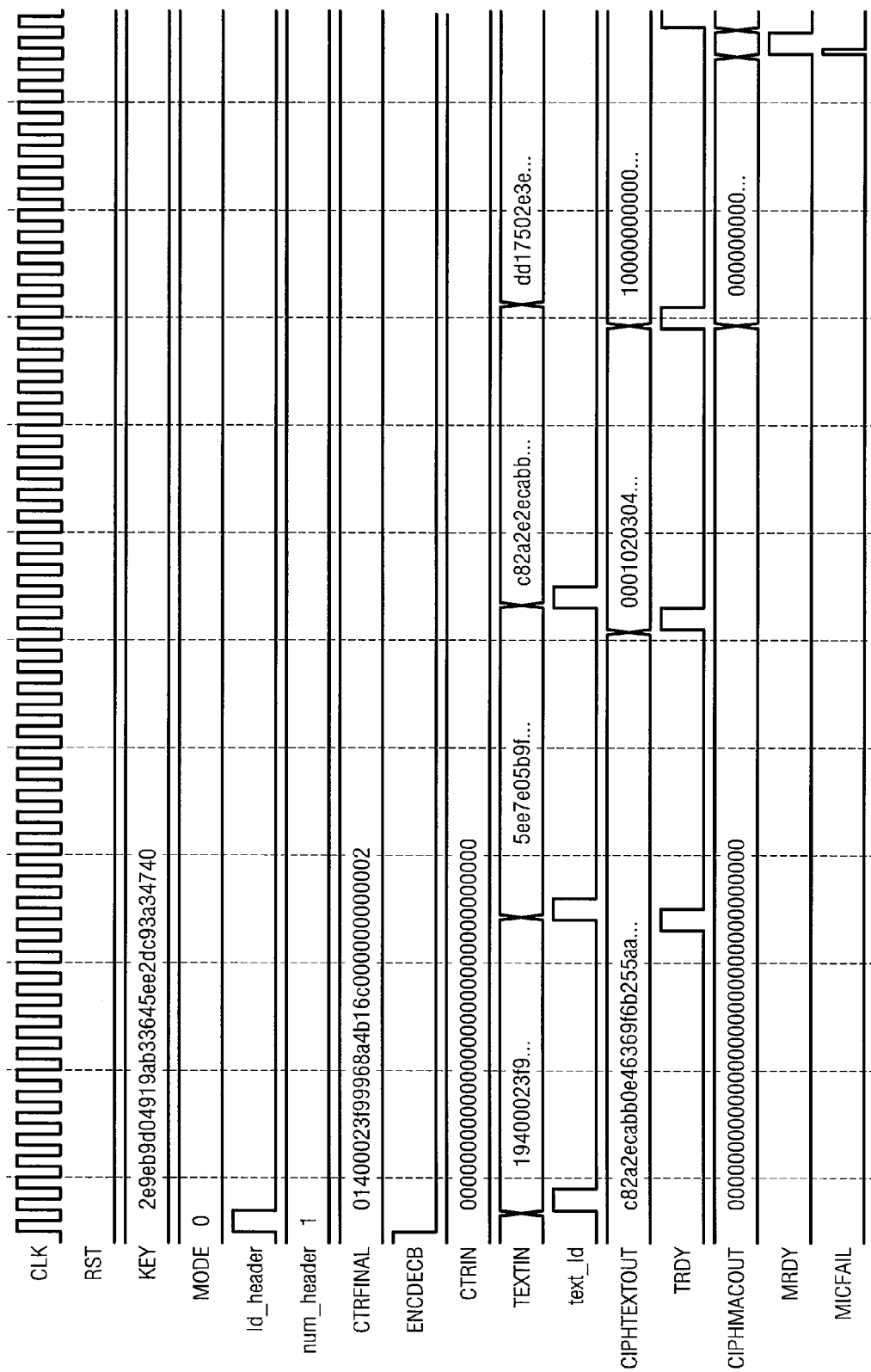
FIG. 4 shows a timing diagram of selected signals for exemplary automatic decryption according to the present inventions.

FIG. 4 shows the timing diagrams of selected signals for automatic decryption on one block of header and two payload blocks. The process is very much the same as for encryption. In this case the AES core 120 and AES core 110 run back to back, since the Ciphertext is decrypted before processing it through AES core 110 for generating the test MIC. The header portion of the payload is processed in the same way as it was done in encryption. During the phases that process the encrypted payload blocks, the Ciphertext is forced in TEXTIN at each TRDY assertion. After the last Ciphertext data is forced. the MIC Ciphertext to be authenticated should be forced after the assertion of TRDY so that processor 100 can compare the test MIC (the locally generated one) with the MIC Ciphertext received for authentication, and can assert MICFAIL in case the two MICs do not match. MICFAIL is a combinatorial output should be registered at the interface. Alternatively, the user could ignore the MICFAIL input and compare the locally generated MIC Ciphertext and the received MIC. Processor 100 compares only the lower 8 bytes of the MIC Ciphertext.

Figure 5:
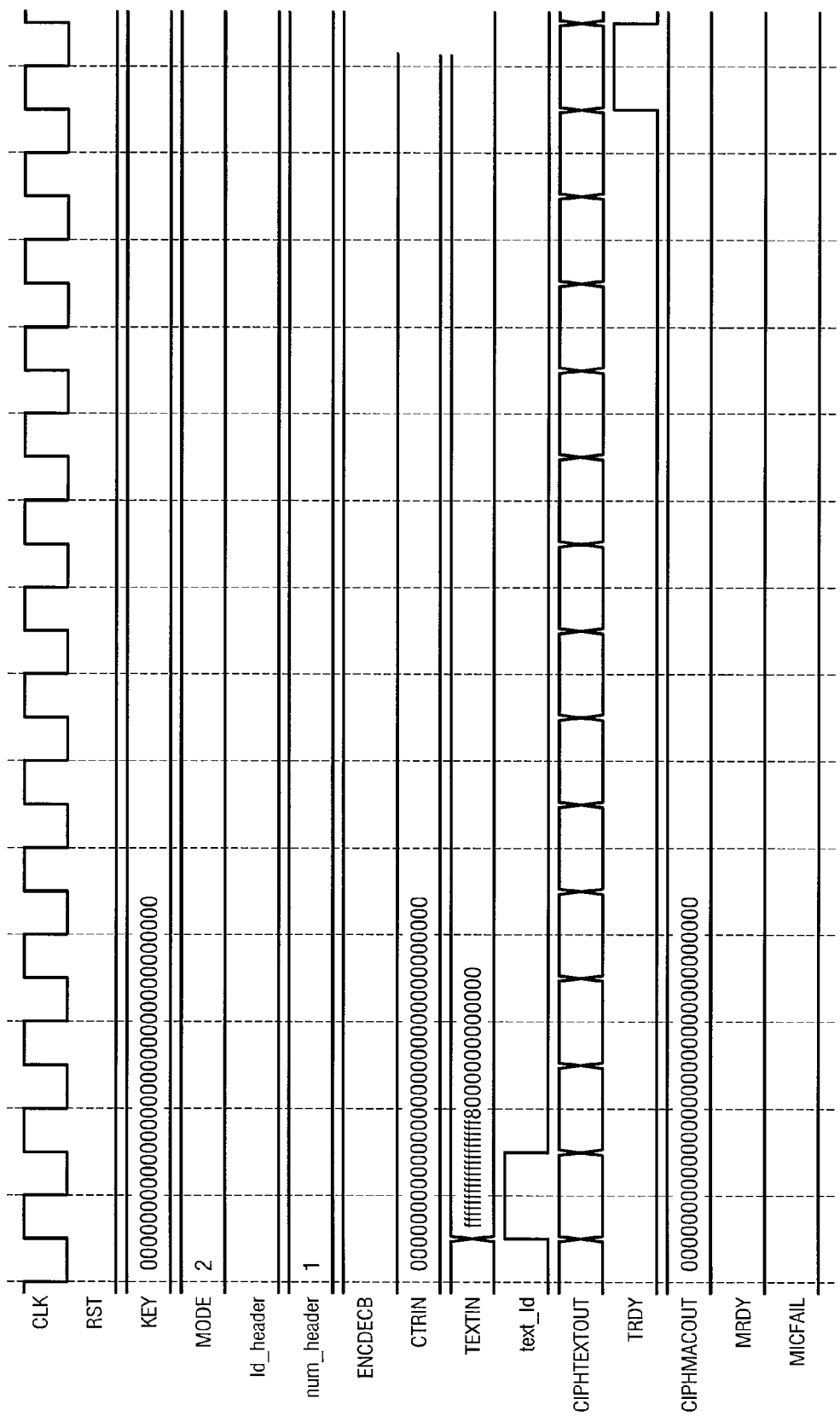
FIG. 5 shows a timing diagram of selected signals for exemplary plain mode encryption according to the present inventions.

FIG. 5 shows the timing diagrams of selected signals for plain mode encryption on one data block. In this Mode, the processor 100 loads the TEXT_IN and gives the Ciphertext on CIPHTEXTOUT output. ENCDECB should be tied high. LD_HEADER should be low. TRDY indicates that the Ciphertext is available on the CIPHTEXTOUT.

While the present inventions have been particularly described with respect to the illustrated embodiments, it will be appreciated that various alterations, modifications and adaptions may be made based on the present disclosure, and are intended to be within the scope present inventions. While the inventions has been described in connection with what are presently considered to be the most practical and preferred embodiments, it is to be understood that the present inventions are not limited to the disclosed embodiments but, on the contrary, are intended to cover various modifications and equivalent arrangements included within the scope of the appended claims.

What is claimed is:

1. A processor that processes message data according to a cipher block chaining messaging authentication code (CCM) protocol, the processor comprising:
    a first input (TEXTIN) to receive headers and payloads of messages in block form;
    a second input (KEY) to receive a cipher key;
    a third input (CTRFINAL) to receive a counter block;
    a fourth input (TEXT_LD) to receive an indication that a data block is ready to be received at the processor's first input;
    a first output (CIPHERTEXTOUT) to provide a data block processes according to a cipher block chaining messaging authentication code (CCM) protocol;
    a second output (TRDY) to provide signal requesting the provision of a data block at the processor's first input;
    a first cipher circuit having a first input to receive a data block to be ciphered, a second input coupled to the processor's second input to receive a cipher key, a first output to provide a ciphered result, the first cipher circuit generating a ciphered result at its first output that is a function of a data block presented at its first input and a cipher key presented at its second input;
    a second cipher circuit having a first input to receive a data block to be ciphered, a second input coupled to the processor's second input to receive a cipher key, a first output to provide a ciphered result, the first cipher circuit generating a ciphered result at its first output that is a function of a data block presented at its first input and a cipher key presented at its second input;
    a controller coupled to receive at least the processor's first, third, and fourth inputs and to receive the first outputs of the first and second cipher circuits, and further coupled to provide data to the first inputs of the first and second cipher circuits, and to provide the outputs of the processor, the second controller having a first memory (Y) to store intermediate data blocks, wherein the controller circuit processes a first sequence of data blocks through the first cipher circuit to generate a message integrity code and a second sequence of data blocks through the second cipher circuit to generate a set of ciphered data blocks, wherein at least one of the data blocks in the first sequence is generated from data held in the first memory and a data block provided at the processor's first input, and wherein at least one of the data blocks in the second sequence is generated from a data block provided at the processor's first input.

2. The processor of claim 1 further comprising:
    a fifth input (NUM_HEADER) to indicate the number of header blocks;
    a sixth input (LD_HEADER) as an indication to the processor to load the signals at the third and fifth inputs;
    a third output (CIPHMICOUT) to provide a generated MIC according to a cipher block chaining messaging authentication code (CCM) protocol;
    a fourth output (MRDY) to indicate that MIC is available on the third output; and
    wherein the controller further receives the fifth and sixth inputs.

3. The processor of claim 1 wherein the controller comprises a mode to decrypt data blocks provided at its first input.

4. The processor of claim 1 wherein the controller comprises a mode to encrypt data blocks provided at its first input.

5. The processor of claim 1 wherein the controller comprises a mode to encrypt a data block provided at its first input according to the cipher function of one of the cipher circuits.

6. The processor of claim 1 wherein the controller generates a plurality of counter blocks to use in generating its second sequence of data blocks, the counter blocks being generated from the counter block provided at the processor's third input.

7. The processor of claim 6 wherein a set of bits is varied in the plurality of counter blocks generated by the controller.

8. The processor of claim 6 wherein the plurality of counter blocks generated by the controller have a first group of bits that are the same, and a second group of bits that are incremented in the sequence of counter blocks.

9. The processor of claim 1 further comprising a fifth input (CTRFINAL) to receive one or more additional counter blocks; and wherein the controller obtains at least one counter block from the fifth input to use in generating its second sequence of data blocks.

10. The processor of claim 1 wherein the number of payload blocks is conveyed in selected bits of the counter block provided on the processor's third input.

11. The processor of claim 1 wherein the controller comprises a memory Y and a mode to encrypt data blocks provided at its first input, the controller comprising:

a first processing state in which one or more header blocks are received at the processor's first input, each header block being XORed with the contents of memory Y, the result being ciphered by the first cipher circuit and thereafter stored in memory Y;

a second processing state in which payload blocks are received at the processor's first input, each payload block being XORed with the contents of memory Y, the result ciphered by the first cipher circuit and thereafter stored in memory Y, and wherein each payload block is XORed with a ciphered counter block and provided as an output, the ciphered counter block being ciphered by the second cipher circuit;

a third processing state in which a message-integrity code is generated by XORing the contents of memory Y with a ciphered counter block generated by ciphering the counter block provided at the processor's third input.

12. The processor of claim 1 wherein the controller comprises a memory Y, memory S, and a mode to decrypt encrypted data blocks provided at its first input, the controller comprising:

a first processing state in which one or more header blocks are received at the processor's first input, each header block being XORed with the contents of memory Y, the result being ciphered by the first cipher circuit and thereafter stored in memory Y;

a second processing state in which the first encrypted payload block is received at the processor's first input, the encrypted payload block being XORed with the contents of memory Y, the result being ciphered by the first cipher circuit and thereafter stored in Y, and further wherein the first encrypted payload block is XORed with a ciphered counter block, provided to the processor's first output, and temporarily stored as a saved decrypted payload block, the counter block being ciphered by the second cipher circuit with the ciphered counter block being stored in memory S;

a third processing state wherein the remaining encrypted payload blocks are received at the processor's first input, wherein the contents of memory Y is XORed with the saved decrypted payload block and thereafter ciphered by the first cipher circuit, the result of which is stored in memory Y, and further wherein each encrypted payload block is XORed with a ciphered counter block, provided to the processor's first output, and temporarily stored as a saved decrypted payload block, the counter block being ciphered by the second cipher circuit with the ciphered counter block being stored in memory S; and a fourth state in which the contents of memory Y is XORed with the saved decrypted payload block and thereafter ciphered by the first cipher circuit, the result of which is stored in memory Y, and further wherein the counter block provided at the processor's third input is ciphered by a second cipher circuit and the result XORed with the contents of memory Y to generate a test message-integrity code.

13. The processor of claim 12 wherein the fourth state further receives a message-integrity code to be authenticated at the processor's first input, wherein the processor compares the received message-integrity code with the test message-integrity code, and generates a failure indication if the two codes are different in the most significant 64 bits.

14. The processor of claim 12 wherein the fourth state further provides the text message-integrity code on third output.

15. The processor of claim 12 wherein the saved decrypted payload blocks are temporarily stored in memory S.

* * * * *

UNITED STATES PATENT AND TRADEMARK OFFICE
CERTIFICATE OF CORRECTION

PATENT NO. : 7,649,992 B2
APPLICATION NO. : 11/326712
DATED : January 19, 2010
INVENTOR(S) : Kartik Raju et al.

Page 1 of 1

It is certified that error appears in the above-identified patent and that said Letters Patent is hereby corrected as shown below:

Column 9, Line 44, after "MSB" delete "L".
Column 12, Line 9, after "signal Pmode" delete "[10]" and insert --[1:0] --.

Signed and Sealed this
Fourth Day of October, 2011

David J. Kappos
*Director of the United States Patent and Trademark Office*